(12) United States Patent
Bai et al.

(10) Patent No.: US 9,787,182 B2
(45) Date of Patent: Oct. 10, 2017

(54) SELF-ADAPTION CURRENT CONTROL CIRCUIT

(71) Applicant: JOULWATT TECHNOLOGY (HANGZHOU) CO., LTD., Hangzhou (CN)

(72) Inventors: Lang Bai, Hangzhou (CN); Biliang Huang, Hangzhou (CN); Yuancheng Ren, Hangzhou (CN); Xunwei Zhou, Hangzhou (CN)

(73) Assignee: JOULWATT TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 15/219,174

(22) Filed: Jul. 25, 2016

(65) Prior Publication Data
US 2017/0194856 A1 Jul. 6, 2017

(30) Foreign Application Priority Data
Jan. 5, 2016 (CN) .......................... 2016 1 0006682

(51) Int. Cl.
*G05F 1/56* (2006.01)
*H02M 3/156* (2006.01)
*H02M 1/08* (2006.01)
*H05B 33/08* (2006.01)
*H02M 1/15* (2006.01)

(52) U.S. Cl.
CPC .............. *H02M 3/156* (2013.01); *H02M 1/08* (2013.01); *H02M 1/15* (2013.01); *H05B 33/0815* (2013.01)

(58) Field of Classification Search
CPC ................................. H02M 3/156; G05F 1/56
USPC .......................................... 323/273–285, 315
See application file for complete search history.

(56) References Cited

U.S. PATENT DOCUMENTS

| | | | | |
|---|---|---|---|---|
| 4,485,296 A * | 11/1984 | Ueda | ...................... | G05D 23/24 219/212 |
| 6,140,806 A * | 10/2000 | Gohara | ................... | G05F 3/242 323/282 |
| 6,269,011 B1 * | 7/2001 | Ohshima | ................ | H02H 3/087 323/908 |
| 6,335,577 B1 * | 1/2002 | Baba | ...................... | H02H 3/087 307/28 |
| 2007/0241730 A1* | 10/2007 | Dow | ....................... | G05F 1/575 323/280 |
| 2008/0030268 A1* | 2/2008 | Quilter | ...................... | H03F 1/32 330/10 |
| 2008/0136398 A1* | 6/2008 | Nakashimo | ............. | G05F 1/569 323/299 |

(Continued)

*Primary Examiner* — Adolf Berhane
*Assistant Examiner* — Nusrat Quddus
(74) *Attorney, Agent, or Firm* — Perkins Coie LLP

(57) ABSTRACT

A self-adaption current control circuit includes: a regulating transistor, a first sampling comparison circuit, a proportion control circuit, a variable sampling resistor, and a second sampling comparison circuit. The self-adaption current control circuit adjusts the resistance value of the variable sampling resistor and the coefficient of the proportion circuit simultaneously through the proportion control circuit. Meanwhile, the resistance value of the variable sampling resistor and the coefficient of the proportion circuit can be increased or decreased in the same proportion so that the input voltage of a second sampling comparison circuit can be in an appropriate input range.

8 Claims, 5 Drawing Sheets

(56) References Cited

U.S. PATENT DOCUMENTS

| | | | |
|---|---|---|---|
| 2012/0293562 A1* | 11/2012 | Park | ............... G09G 3/3233 345/690 |
| 2013/0193939 A1* | 8/2013 | Sakaguchi | ............ H02H 9/02 323/277 |

* cited by examiner

SELF-ADAPTION CURRENT CONTROL CIRCUIT

CROSS-REFERENCE TO RELATED APPLICATIONS

This Non-provisional application claims priority under 35 U.S.C. §119(a) on Patent Application No(s). 201610006682.6 filed in People's Republic of China on Jan. 5, 2016, the entire contents of which are hereby incorporated by reference.

BACKGROUND OF THE INVENTION

Field of the Invention

This invention relates to the circuit technical field, in particular to a self-adaption current control circuit.

Description of the Related Art

A current source can provide a certain direct current (DC) with stable amplitude to a load. Therefore, the current source is widely used, especially in the power supply field of light emitting diode (LED) lamps. Currently, most of DC power supplies directly convert alternating current (AC) network power into DC power with a sinusoidal ripple and output it, and it turns to be the DC with the sinusoidal ripple when being loaded on an LED lamp.

However, in the actual application, it is often required to filter the sinusoidal ripple of the current for the load. Therefore, the current is often stabilized by using a constant current control circuit having a current source filter circuit. Please refer to FIG. 1 which is a schematic diagram of an existing constant current control circuit including a current source 1, a filter capacitor 2, and an LED load 3. The LED load 3 is connected with the regulating transistor 4, the source gate of the regulating transistor 4 is connected with a sampling resistor 5, and the control gate of the regulating transistor 4 is connected with the output end of an operational amplifier 6. When the output of the current source 1 has certain fluctuation, the operational amplifier 6 controls the regulating transistor 4 through the comparison between a voltage signal on the sampling resistor 5 and a self-adaption reference voltage signal $V_{ref}$, so that the current of the LED load 3 is close to constant current and equals to the input current. However, in the conventional constant current control circuit having the current source filter circuit, when the output current of the current source 1 is relatively large or small, the input voltage value of the operational amplifier 6 may exceed the appropriate input range and result in a narrower applicable current range.

BRIEF SUMMARY OF THE INVENTION

This invention provides a self-adaption current control circuit. The resistance value of a variable sampling resistor can be automatically adjusted, allowing the input voltage of an operational amplifier to be in an appropriate input range, so as to be compatible with a load current in a larger range.

In order to realize the above purpose, the invention provides a self-adaption current control circuit including a regulating transistor, a first sampling comparison circuit, a proportion control circuit, a variable sampling resistor, and a second sampling comparison circuit;

wherein the regulating transistor and the variable sampling resistor form a series circuit, one end of the series circuit is connected with a current input end, and the other end is connected with a current output end;

the first sampling comparison circuit takes a sample of a first sampling signal corresponding to the regulating transistor, generates a first integral signal after comparing and evaluating an integral of the first sampling signal and a first setting threshold value, and generates a command signal after the first integral signal passes through a proportion circuit;

the proportion control circuit generates a first control signal through a comparison between the obtained command signal and a second setting threshold value, a resistance value of the variable sampling resistor and a coefficient of the proportion circuit are adjusted through the first control signal, an increasing proportion or a decreasing proportion of the resistance value of the variable sampling resistor is consistent with an increasing proportion or a decreasing proportion of the coefficient of the proportion circuit; and the second sampling comparison circuit obtains a second sampling signal through the variable sampling resistor and generates a second control signal after comparing and amplifying the second sampling signal and the obtained command signal, and a current of the regulating transistor is controlled through the output second control signal.

Optionally, the first sampling comparison circuit may include the first comparator, an integral circuit, and the proportion circuit. The first input end of the first comparator may take a sample of a drain terminal voltage of the regulating transistor. A second input end of the first comparator may be the first setting threshold value, an output end of the first comparator may be connected with an input end of the integral circuit, and an output end of the integral circuit may be connected with an input end of the proportion circuit. As an output end of the first sampling comparison circuit, an output end of the proportion circuit may be connected with the second sampling comparison circuit and the proportion control circuit, respectively. A coefficient control end of the proportion circuit may be connected with the proportion control circuit. The resistance value of the variable sampling resistor and the coefficient of proportion circuit may be increased and decreased in a same proportion.

Optionally, the integral circuit may be a capacitor or a digital integrator.

Optionally, the second sampling comparison circuit may include a first amplifier. A first input end of the first amplifier may be connected with the output end of the first sampling comparison circuit, a second input end of the first amplifier may be connected with a sampling end of the variable sampling resistor, and an output end of the first amplifier may be connected with a control end of the regulating transistor.

Optionally, the second setting threshold value may include an upper threshold voltage and a lower threshold voltage. The upper threshold voltage may be larger than the lower threshold voltage. The proportion control circuit may generate the first control signal according to the upper threshold voltage, the lower threshold voltage, and the command signal and adjust the resistance value of the variable sampling resistor and the coefficient of the proportion circuit. The increasing proportion or the decreasing proportion of the resistance value of the variable sampling resistor may be consistent with that of the coefficient of the proportion circuit. When the command signal is higher than the upper threshold voltage, the resistance value of the variable sampling resistor and the coefficient of the proportion circuit may be decreased in a same proportion; when the command signal is lower than the lower threshold voltage, the resistance value of the variable sampling resistor and the coefficient of the proportion circuit may be increased in a same proportion.

Optionally, the proportion control circuit may include a second comparator, a third comparator, and a proportion regulating circuit. First input ends of the second comparator and the third comparator may be connected with the output end of the first sampling comparison circuit, respectively. A second input end of the second comparator may be connected with the upper threshold voltage, a second input end of the third comparator may be connected with the lower threshold voltage, and the second comparator and the third comparator may control the proportion regulating circuit to output the first control signal.

Optionally, the regulating proportion of the first control signal output by the proportion regulating circuit may be a constant or non-constant proportion.

Optionally, the first setting threshold value may be a fixed threshold value or a self-adaption threshold value.

Optionally, when the first setting threshold value is the self-adaption threshold value, the first setting threshold value may be adjusted according to the command signal to ensure the regulating transistor works in a saturation working area.

Compared with the existing technology, the technical scheme has the following advantages:

The self-adaption current control circuit conducts the same proportion adjustment on the resistance value of the variable sampling resistor and the coefficient of the proportion circuit through the proportion control circuit. When the preceding input current is increased, the command signal will be larger than the upper threshold voltage in the proportion control circuit, the proportion regulating circuit will generate the first control signal so that the resistance value of the variable sampling resistor and the coefficient of the proportion circuit can be decreased in the same proportion. Thus, the command signal can be between the upper and the lower threshold voltages of the proportion control circuit, the input of the second sampling circuit can be in an appropriate range, the sampling resistor loss can be reduced, and the system efficiency can be improved at the same time. When the preceding input current is reduced, the command signal will be smaller than the lower threshold voltage of the proportion control circuit, and the proportion regulating circuit will generate the first control signal so that the resistance value of the variable sampling resistor and the coefficient of the proportion circuit can be increased in the same proportion. Thus, the command signal can be between the upper and the lower threshold voltages of the proportion control circuit, allowing the input of the second sampling circuit to be in the appropriate range.

DETAILED DESCRIPTION OF THE INVENTION

The applicant found that the conventional current source had a constant current control circuit having a current source filter circuit. Since the input voltage of an operational amplifier has a certain range, the applicable current range is narrow, and the power consumption of the constant current control circuit is large and the efficiency is low when the preceding input current is large.

Therefore, the embodiment of this invention provides a self-adaption current control circuit. Through the dynamic regulation of the resistance value of the variable sampling resistor, within a larger preceding input current change range, the input voltage of the operational amplifier can still be in an appropriate range, and high efficiency of the system can be realized at the same time.

By combining with the accompanied drawings and the specific embodiments, the technical schemes of the invention are described clearly and completely.

Figure 1:
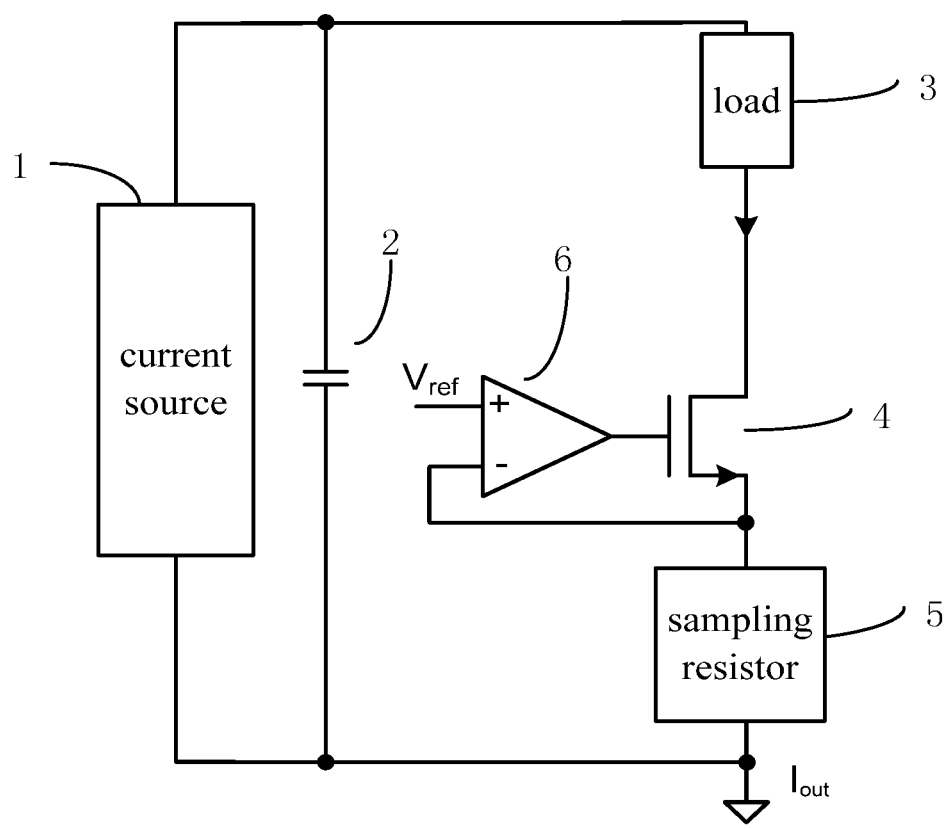
FIG. 1 is a circuit structural schematic diagram of a constant current control circuit in prior art.
Figure 2:
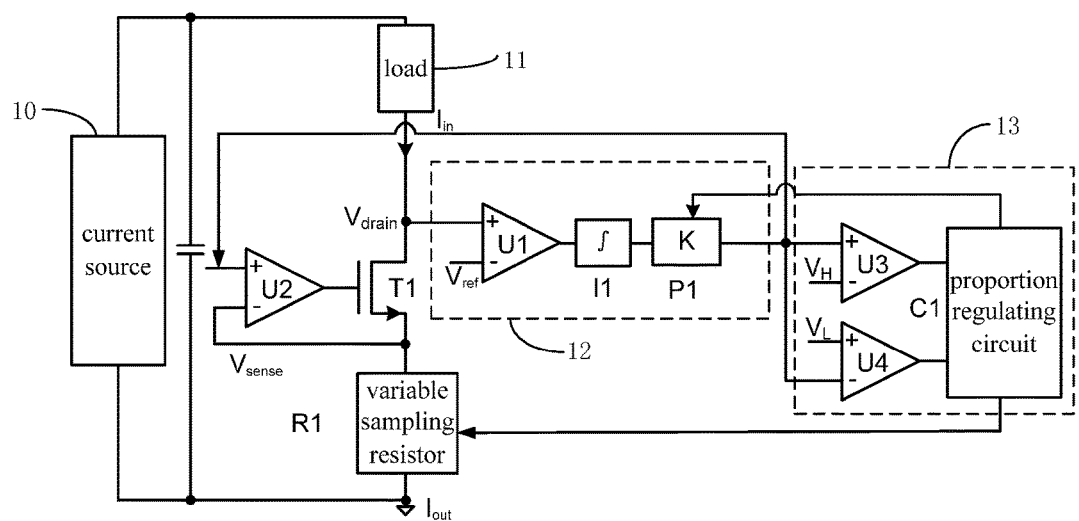
FIG. 2 is a circuit structural schematic diagram of a self-adaption current control circuit according to one embodiment of this invention.

Please refer to FIG. 2. The invention provides a self-adaption current control circuit, and a current input end or a current output end of the self-adaption current control circuit is electrically connected with a load powered by a direct current (DC) source. In the embodiment, one end of the load 11 is connected with the DC source 10, the other end is connected with the current input end of the self-adaption current control circuit, and the DC source 10 is in parallel connection with a filter capacitor for filtering. In the first embodiment of the invention, the self-adaption current control circuit includes: a regulating transistor T1, a first sampling comparison circuit 12, a proportion control circuit 13, a variable sampling resistor R1, and a second sampling comparison circuit U2.

The regulating transistor T1 and the variable sampling resistor R1 are connected in series to form a series circuit, one end of the series circuit is connected with the current input end "$I_{in}$", and the other end is connected with the current output end "$I_{out}$". The regulating transistor is a metal oxide semiconductor (MOS) or a triode. In this embodiment, the regulating transistor is an MOS.

The positions of the load 11 and regulating transistor T1 can be exchanged in other embodiments.

The first sampling comparison circuit 12 takes a sample of a first sampling signal corresponding to the regulating transistor T1, generates a first integral signal after comparing and evaluating an integral of the first signal and a first setting threshold value $V_{ref}$, and generates a command signal after the first integral signal passes through a proportion circuit.

Figure 3:
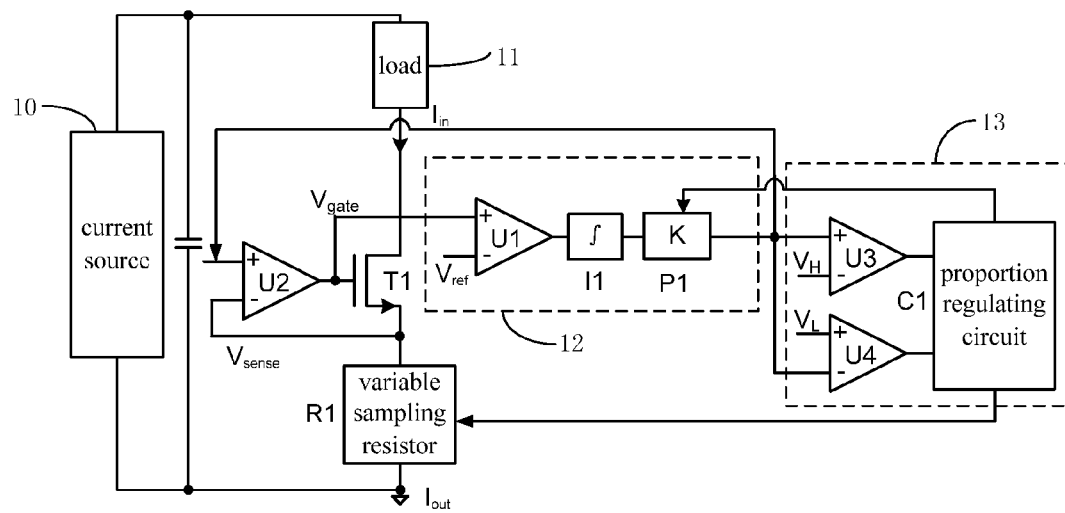
FIG. 3 is a circuit structural schematic diagram of a self-adaption current control circuit according to another embodiment of the invention.

In the embodiment, the first sampling signal is a drain voltage of the regulating transistor. Please refer to FIG. 3. The first sampling signal can also be a control voltage of the regulating transistor, also referred as gate voltage.

In other embodiments, when the regulating transistor is an NPN triode, the first sampling signal may be the collector voltage of the NPN triode.

In this embodiment, the first sampling comparison circuit 12 includes a first comparator U1, an integral circuit I1, and a proportion circuit P1. A first input end of the first comparator U1 takes a sample of the drain voltage of the regulating transistor T1, and a second input end of the first comparator U1 is the first setting threshold value $V_{ref}$. An output end of the first comparator U1 is connected with an input end of the integral circuit I1, and an output end of the integral circuit I1 is connected with an input end of the proportion circuit P1. As an output end of the first sampling comparison circuit 12, an output end of the proportion circuit P1 is connected with the second sampling comparison circuit U2 and the proportion control circuit 13, respectively. A coefficient control end of the proportion circuit P1 is connected with the proportion control circuit 13. The resistance value of the variable sampling resistor R1 and the coefficient of the proportion circuit P1 are increased or decreased in a same proportion.

The comparative results of the first comparator U1 in the invention hereof are integrated, and the ripples carried by inputting the current source are filtered out to realize constant DC. After the integration, the integral result can be increased or decreased by the proportion circuit P1 to obtain the command signal, so as to adapt to different gate voltages or drain voltages, such as the sine.

In other embodiments, the comparative result of the first comparator U1 shall be increased or decreased directly by the proportion circuit P1 to obtain the command signal.

In the embodiment, the first setting threshold value $V_{ref}$ is a fixed threshold value. When the first sampling signal is lower than the threshold voltage, the command signal gets smaller, and when the first sampling signal is higher than the threshold voltage, the command signal gets larger.

In other embodiments, the first setting threshold value $V_{ref}$ can be a self-adaption threshold value, which may vary along with the change of the preceding input current, such that the drain voltage of the regulating transistor T1 can guarantee that the regulating transistor T1 is always in a saturation working area under different input currents. In the embodiment, the integral circuit I1 is a capacitor, one end of the capacitor is connected with the output end of the first comparator U1, and the other end is grounded. The comparative results of the first comparator U1 are integrated by the capacitor.

In other embodiments, the integral circuit can be other suitable integral circuits such as a digital integrator.

The proportion control circuit 13 generates a control signal based on the obtained command signal to adjust the resistance value of the variable sampling resistor R1 and the coefficient of the proportion circuit P1 in the same proportion, so as to be compatible with the different preceding input currents.

The proportion control circuit 13 generates a first control signal through the comparison between the obtained command signal and a second setting threshold value. The second setting threshold value includes an upper threshold voltage $V_H$ and a lower threshold voltage $V_L$, and the upper threshold voltage $V_H$ is larger than the lower threshold voltage $V_L$. The resistance value of the variable sampling resistor and the coefficient of the proportion circuit can be increased or decreased in the same proportion by the first control signal. In the embodiment, the upper threshold voltage $V_H$ is in correspondence with the appropriate highest input voltage of the second sampling comparison circuit, and the lower threshold voltage $V_L$ is in correspondence with the appropriate lowest input voltage of the second sampling comparison circuit.

In the embodiment, the proportion control circuit 13 includes a second comparator U3, a third comparator U4, and a proportion regulating circuit C1. First input ends of the second comparator U3 and the third comparator U4 are connected with the output end of the first sampling comparison circuit 12, respectively. A second input end of the second comparator U3 is connected with the upper threshold voltage $V_H$, a second input end of the third comparator U4 is connected the lower threshold voltage $V_L$, and output ends of the second comparator U3 and the third comparator U4 are connected with the proportion regulating circuit C1. The variable sampling resistor and the proportion circuit can be regulated by the first control signal output by the proportion regulating circuit C1, respectively. In other embodiments, the output ends of the second comparator U3 and the third comparator U4 may be connected with the proportion regulating circuit C1 and the proportion circuit, and the variable sampling resistor can be regulated by the first control signal output by the proportion regulating circuit C1. In addition, the proportion circuit can be controlled and regulated by the comparative result of the second comparator U3 and third comparator U4.

Figure 4:
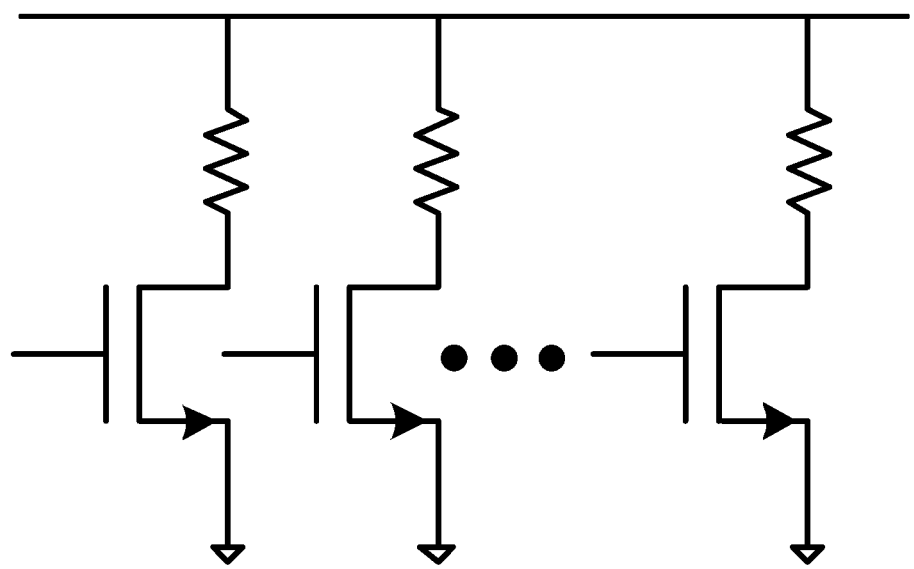
FIG. 4 is a circuit diagram of sampling resistor according to one embodiment of the invention.

In the embodiment, please refer to FIG. 4, the variable sampling resistor R1 is a parallel circuit with multiple resistances connected in parallel, and each parallel circuit is connected in series with a switch tube. The proportion control circuit is connected with a control end of each switch tube, respectively.

In other embodiments, the variable sampling resistor may also be other variable resistance elements or variable resistance circuits whose resistance can be changed by electric control. The variable resistance element can be ceramic variable resistance element or oxide coated variable resistance element, the variable resistance circuits can be several series connected resistors, each of the resistor is in parallel connection with a switch tube, and the proportion control circuit is connected with a control end of each switch tube, respectively.

The second sampling comparison circuit U2 obtains a second sampling signal through the variable sampling resistor and comparing and amplifying the second sampling signal and the obtained command signal. The current of the regulating transistor is controlled through the second output comparison signal. In the embodiment, the second sampling comparison circuit U2 is the first amplifier which is a differential amplifier. A first input end of the first amplifier is connected with the output end of the first sampling comparison circuit 12, a second input end of the first amplifier is connected with a sampling end of the variable sampling resistor R1, and an output end of the first amplifier is connected with a control end of the regulating transistor T1. The stability of the load current is realized and the ripple is eliminated by the regulating transistor T1.

In the proportion control circuit 13, when the command signal is located between the upper threshold voltage $V_H$ and the lower threshold voltage $V_L$, the resistance value of the variable sampling resistor and the coefficient of the proportion circuit do not need to be regulated by the proportion regulating circuit C1.

When the command signal is larger than the upper threshold voltage $V_H$ caused by increasing of the preceding input current, i.e. the command signal is larger than the appropriate highest input voltage of the second sampling comparison circuit, the resistance value of the variable sampling resistor and the coefficient of the proportion circuit will be decreased in the same proportion by the first control signal output by the proportion regulating circuit C1. Therefore, the power dissipation of the resistance is reduced, and the system efficiency is improved. Meanwhile, since the voltage of the second sampling signal and the command signal are reduced in the same proportion, the input voltage of the second sampling comparison circuit can be ensured in an appropriate input range, thereby ensuring a high precision work, and the current feedback loop remains stable and the current of the regulating transistor is constant.

When the command signal is less than the lower threshold voltage $V_L$ caused by decreasing of the preceding input current, i.e. the command signal is smaller than the appropriate lowest input voltage of the second sampling comparison circuit, the resistance value of the variable sampling resistor and the coefficient of proportion circuit will be increased in the same proportion by the first control signal output by the proportion regulating circuit C1. Since the input voltage of the first amplifier (namely the second sampling signal) and the command signal are increased in the same proportion, the input voltage of the second sampling comparison circuit can be in an appropriate range, thereby ensuring the high precision work. That is, smaller preceding input current can also ensure the less error of the second sampling comparison circuit so as to improve the efficiency of removing the ripple of the input current.

Figure 5:
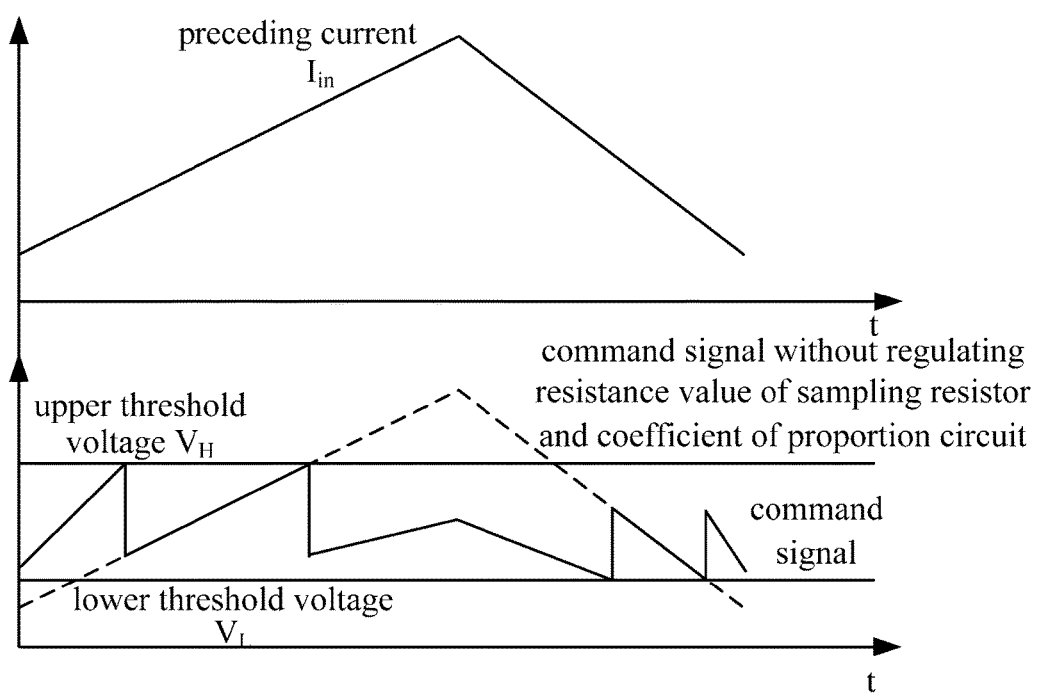
FIG. 5 is a waveform reference diagram showing a command signal is controlled to fluctuate between an upper threshold voltage and a lower threshold voltage according to one embodiment of the invention.

In the embodiment, the resistance value of the variable sampling resistor and the coefficient of the proportion circuit are increased or decreased in the same proportion, the regulating coefficient of the proportion regulating circuit C1 is constant, such as N times or 1/N times. When the command signal is still larger than the upper threshold voltage or smaller than the lower threshold voltage after one time of regulation, the regulation shall be continued until the command signal is located between the upper threshold voltage and the lower threshold voltage. The waveform of the preceding input current and the command signal is shown in FIG. 5. The upper threshold voltage and the lower threshold voltage correspond to the appropriate highest input voltage and the appropriate lowest input voltage of the second sampling comparison circuit U2, respectively. By regulating the upper threshold voltage and the lower threshold voltage, the input voltage of the second sampling comparison circuit U2 can be maintained in a high precision regulating range.

In other embodiments, the coefficient for each regulation of the proportion regulating circuit C1 may also be non-constant.

Although the invention is disclosed by preferred embodiment as above, it is not for limiting the invention. Persons having ordinary skill in the art can make possible changes and modifications to the technical schemes of the invention based on the above disclosed methods and technical contents without departing from the spirit and scope of the invention. Therefore, any contents without departing from the technical schemes of the invention and any simple amendments, equivalent changes, and modifications based on the technical essence of the invention shall belong to the protection scope of the invention.

What is claimed is:

1. A self-adaption current control circuit, comprising:
   a regulating transistor, a first sampling comparison circuit, a proportion control circuit, a variable sampling resistor, and a second sampling comparison circuit;
   wherein the regulating transistor and the variable sampling resistor form a series circuit, one end of the series circuit is connected with a current input end, and the other end is connected with a current output end;
   the first sampling comparison circuit takes a sample of a first sampling signal corresponding to the regulating transistor, generates a first integral signal after comparing and evaluating an integral of the first sampling signal and a first setting threshold value, and generates a command signal after the first integral signal passes through a proportion circuit;
   the proportion control circuit generates a first control signal through a comparison between the obtained command signal and a second setting threshold value, a resistance value of the variable sampling resistor and a coefficient of the proportion circuit are adjusted through the first control signal, an increasing proportion or a decreasing proportion of the resistance value of the variable sampling resistor is consistent with an increasing proportion or a decreasing proportion of the coefficient of the proportion circuit; and
   the second sampling comparison circuit obtains a second sampling signal through the variable sampling resistor and generates a second control signal after comparing and amplifying the second sampling signal and the obtained command signal, and a current of the regulating transistor is controlled through the output second control signal;
   wherein the first setting threshold value is a fixed threshold value or a self-adaption threshold value.

2. The self-adaption current control circuit according to claim 1, wherein the first sampling comparison circuit comprises a first comparator, an integral circuit, and the proportion circuit, a first input end of the first comparator takes a sample of a drain terminal voltage of the regulating transistor, a second input end of the first comparator is the first setting threshold value, an output end of the first comparator is connected with an input end of the integral circuit, an output end of the integral circuit is connected with an input end of the proportion circuit, an output end of the proportion circuit, as an output end of the first sampling comparison circuit, is connected with the second sampling comparison circuit and the proportion control circuit, respectively, a coefficient control end of the proportion circuit is connected with the proportion control circuit, and the resistance value of the variable sampling resistor and the coefficient of the proportion circuit are increased or decreased in a same proportion.

3. The self-adaption current control circuit according to claim 2, wherein the integral circuit is a capacitor or a digital integrator.

4. The self-adaption current control circuit according to claim 1, wherein the second sampling comparison circuit comprises a first amplifier, a first input end of the first amplifier is connected with an output end of the first sampling comparison circuit, a second input end of the first amplifier is connected with a sampling end of the variable sampling resistor, and an output end of the first amplifier is connected with a control end of the regulating transistor.

5. The self-adaption current control circuit according to claim 1, wherein the second setting threshold value comprises an upper threshold voltage and a lower threshold voltage, the upper threshold voltage is larger than the lower threshold voltage, the proportion control circuit generates the first control signal according to the upper threshold voltage, the lower threshold voltage, and the command signal and adjusts the resistance value of the variable sampling resistor and the coefficient of the proportion circuit, the increasing proportion or the decreasing proportion of the resistance value of the variable sampling resistor is consistent with the increasing proportion or the decreasing proportion of the coefficient of the proportion circuit, when the command signal is higher than the upper threshold voltage, the resistance value of the variable sampling resistor and the coefficient of the proportion circuit are decreased in a same proportion; and when the command signal is lower than the lower threshold voltage, the resistance value of the variable sampling resistor and the coefficient of the proportion circuit are increased in a same proportion.

6. The self-adaption current control circuit according to claim 5, wherein the proportion control circuit includes a second comparator, a third comparator, and a proportion regulating circuit, wherein first input ends of the second comparator and the third comparator are connected with an output end of the first sampling comparison circuit, respectively, a second input end of the second comparator is connected with the upper threshold voltage, a second input end of the third comparator is connected with the lower threshold voltage, and the second comparator and the third comparator control the proportion regulating circuit to output the first control signal.

7. The self-adaption current control circuit according to claim 6, wherein a regulating proportion of the first control signal output by the proportion regulating circuit is a constant or non-constant proportion.

8. The self-adaption current control circuit according to claim 1, wherein when the first setting threshold value is a self-adaption threshold value, the first setting threshold value is adjusted according to the command signal to ensure the regulating transistor works in a saturation working area.

* * * * *